United States Patent [19]

Saeki et al.

[11] Patent Number: 5,025,269

[45] Date of Patent: Jun. 18, 1991

[54] COLOR ELECTROSTATIC RECORDING APPARATUS

[75] Inventors: Kiyoshi Saeki, Toyonaka; Toshinori Ohtsuki, Yawata; Kazuo Ueno, Neyagawa, all of Japan

[73] Assignee: Matsushita Electric Industrial Co., Ltd., Osaka, Japan

[21] Appl. No.: 433,212

[22] Filed: Nov. 8, 1989

[30] Foreign Application Priority Data

Nov. 10, 1988 [JP] Japan ................................ 63-284520

[51] Int. Cl.[5] ................................ G01D 15/06

[52] U.S. Cl. ................................ 346/108; 346/136; 346/157

[58] Field of Search ................ 346/108, 136, 160, 157

[56] References Cited

U.S. PATENT DOCUMENTS 4,761,662 8/1988 Yoshimoto et al. ................ 346/108
4,897,677 1/1990 Lai ................................ 346/157

*Primary Examiner*—Mark J. Reinhart
*Attorney, Agent, or Firm*—Wenderoth, Lind & Ponack

[57] ABSTRACT

A color electrostatic recording apparatus in which a color picture can be reproduced without misconvergence of colors through actuating a recording head to expand or contract and compensating the recording position of each image in accordance with the information of expansion/contraction and meandering of a recording medium which has been detected by reading register marks provided on the side edges of the recording medium.

1 Claim, 4 Drawing Sheets

FIG.2
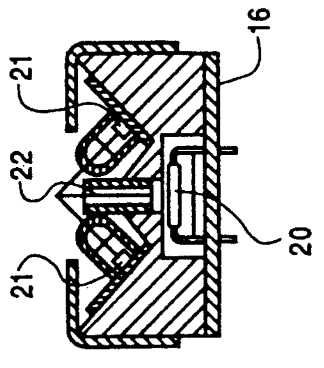
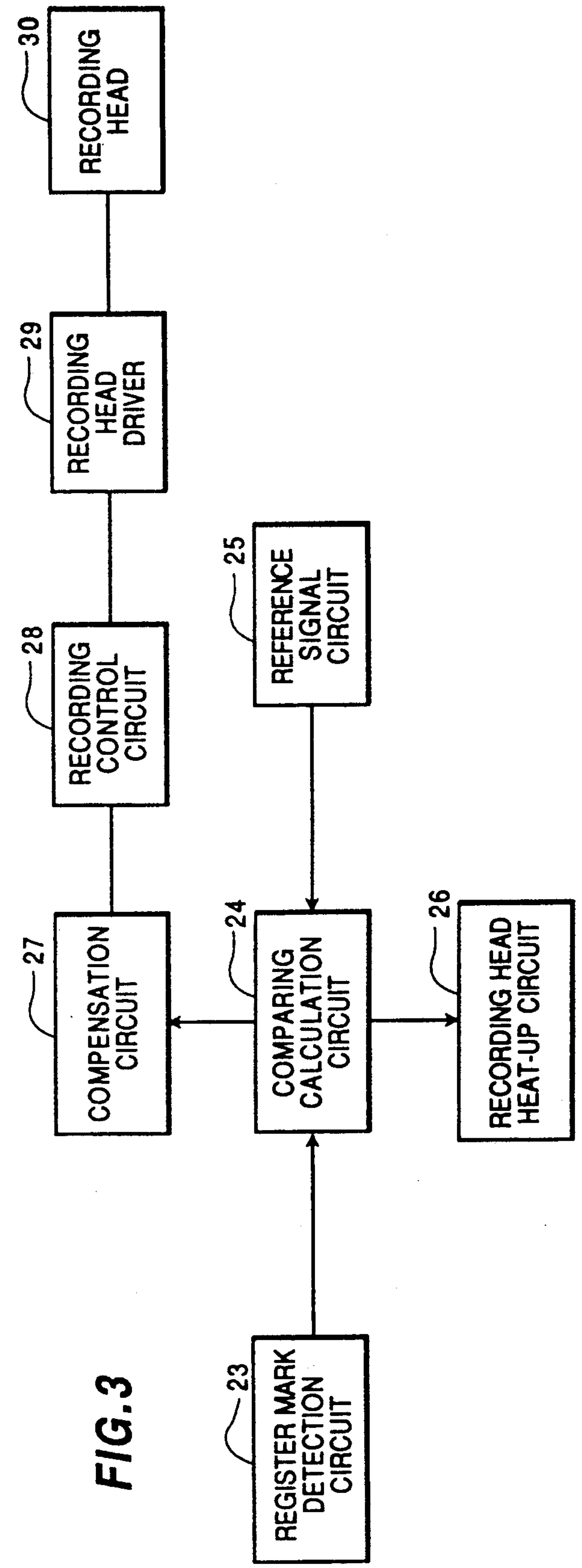
FIG.3

COLOR ELECTROSTATIC RECORDING APPARATUS

BACKGROUND OF THE INVENTION

The present invention relates to a color electrostatic recording apparatus for having a color picture recorded by overlapping different color images successively on a single recording medium.

FIG. 6 is a schematic view showing the arrangement of a prior art color electrostatic recording apparatus in which: represented by 51 is a recording medium; 52 and 53 are respectively a winder and a rewinder for feed-in and -out of a web of electrostatic recording paper for the forward and backward movement; 55 is a multi-pin electrode recording head; 54 is a hold-down roller for keeping the recording medium in contact with the multi-pin electrode recording head; 56 is a static eliminator bar; 57, 58, 59 and 60 are developing devices for supplying with developer materials of their respective colors; 61 is a squeeze for recovering used developer materials; 62 and 63 are a press roller and a drive roller respectively for actuating the recording medium to travel forward and backward; and 64 is a reversible driver source.

The operation in this arrangement will be described. The recording medium 51 is transferred in a direction represented by the arrow A by the drive roller 62. During the transfer, an electrostatic latent image of black picture is produced on an effective screen area of the recording medium 51 by the multi-pin electrode recording head 55 and developed with a black color developer material through electrostatic attraction by the developing device 57. The black color developer material applied is then fused while the remaining of developer material is dislocated for recovery. The recording medium 51 bearing the black color image is wound onto the winder 53 and after the recording of information of the black color image is completed, reversely transferred by the driver source 64 for rewinding onto the rewinder 52. After the rewinding, similar images of second, third, and fourth colors e.g. of cyan, magenta, and yellow respectively are then overlaid one another on the black color image in the above described manner to have a picture of four colors (black, cyan, magenta, and yellow).

However, if changes in both the atmospheric humidity and temperature cause the recording medium to expand and/or contract after the electrostatic development in the first color is completed, the corresponding minimum pitch in the recorded image to the electrode minimum pitch of the multi-pin electrode recording head varies for increase or decrease. This allows no accurate overlapping and results in misconvergence of the colors, which will be regarded as a disadvantage of the prior art arrangement.

SUMMARY OF THE INVENTION

It is an object of the present invention, for overcoming the problem, to provide a color electrostatic recording apparatus in which the colors overlap one another with accuracy and thus, no misconvergence of the colors is involved.

More particularly, the present invention is directed to achieve the object towards an arrangement in which both the amount of expansion/contraction and the degree of meandering on a recording medium which are to be measured at right angles to a transfer direction of the recording medium, are calculated from the information given by a mark detecting means provided adjacent to a multi-pin electrode recording head for detecting the register marks calibrated along both the side edges of the recording medium, and in response to the calculated results, the expansion and contraction of the multi-pin electrode recording head can be controlled and also, the timing of a recording start signal can be adjusted for shift of an image signal in order to execute the recording.

In operation of recording respective colors, the positions of the register marks are detected by the mark detecting means provided along both the side edges of the recording medium when there is some changes in the atmospheric temperature or humidity. Then, in response to the comparison of the expansion/contraction and meandering calculated from the detected results with the reference values, the multi-pin electrode recording head is supplied with thermal energy for uniform increase and/or decrease of the pitch between its electrodes and simultaneously, the timing of the recording start signal is controlled for shift of the image signal. Thus, the positioning of different color images can be made for overlap recording.

BRIEF DESCRIPTION OF THE DRAWINGS

FIG. 2 is a cross sectional view of a position detector means;

FIG. 3 is a block diagram of control sequence;

DESCRIPTION OF THE INVENTION

One embodiment of the present invention will be described with reference to FIGS. 1 to 5.

Figure 1:
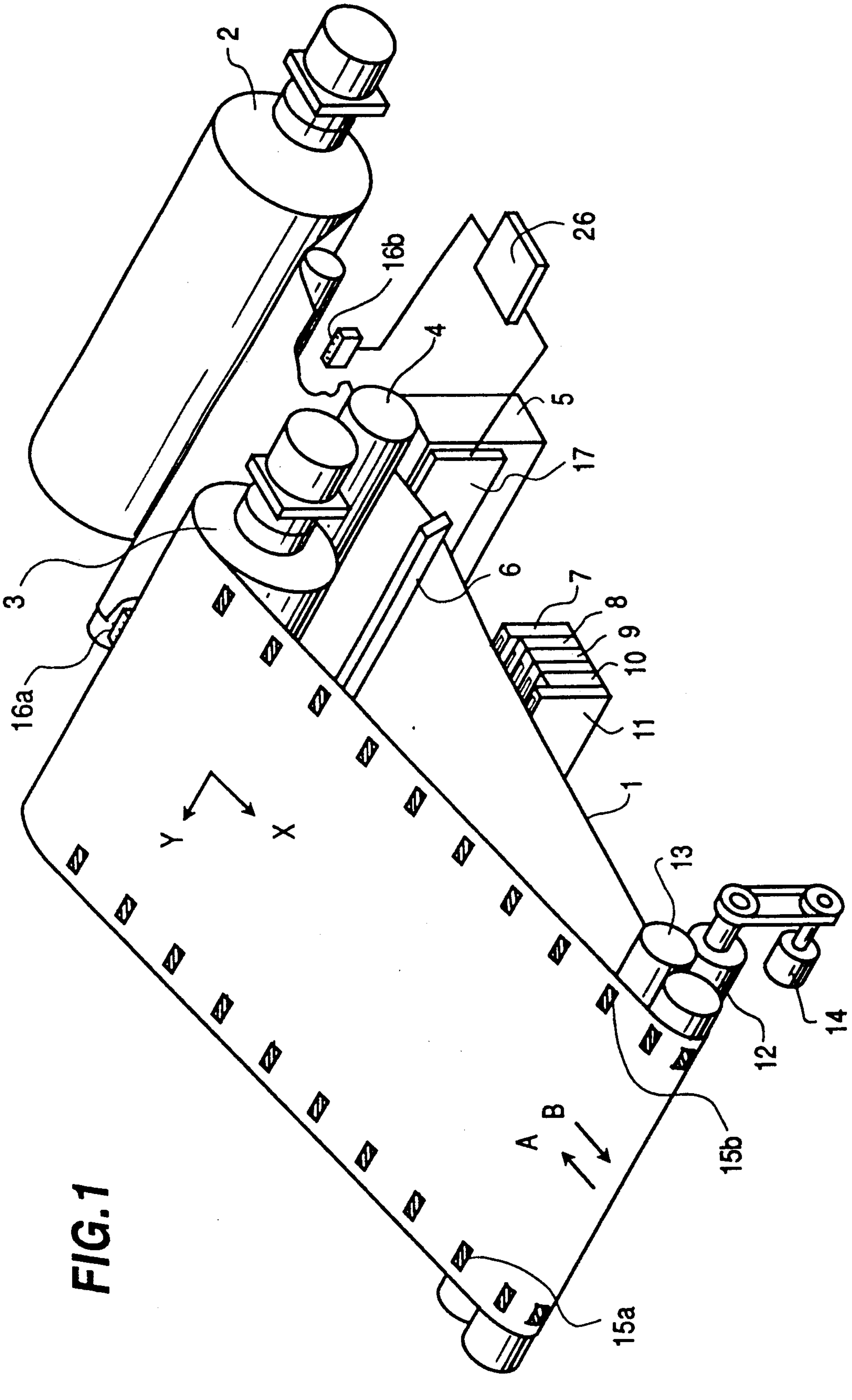
FIG. 1 is a schematic perspective view of a color electrostatic recording apparatus showing an embodiment of the present invention.

FIG. 1 shows the outline arrangement of a color electrostatic recording apparatus of the embodiment according to the present invention, in which represented by the numeral 1 is a recording medium, 2 and 3 are a winder and a rewinder respectively for feed-in and-out of the recording medium 1 for the forward and backward movement; 5 is a multi-pin electrode recording head disposed along a path of the recording medium 1. Also provided are a hold-down roller 4 for holding the recording medium 1 in contact with the multi-pin recording head 5, a static eliminator bar 6, developing devices 7, 8, 9, and 10 for supplying with respective developer materials of different colors, a squeeze 11 for recovering used developer materials, a press roller 12 and a drive roller 13 for gripping and actuating the recording medium to travel forward and backward, and a reversible driver source 14. 15*a* and 15*b* represent series of register marks calibrated on both the side edges of the recording medium respectively, which will be memorized during recording of the first color and used for positioning compensation in recording of the second and over colors. 16*a* and 16*b* are mark detectors for detecting the register marks 15*a* and 15*b* respectively.

As best shown in FIG. 2, each mark detector 16 contains a CCD sensor 20 provided for receiving through an equal-magnification optical system e. g. of Selfoc lens array a ray of light emitted by a lighting means 21 such as a photo-diode and reflected on the surface of the recording medium 1. Additionally, 17 is a heater for expansion and contraction of the multi-pin recording head 5.

The recording medium 1 is transferred in the direction of arrow A by the drive roller 12 and the press roller 13. During the transfer, the information of a black color image is recorded by the multi-pin electrode recording head 5 and one of the developing devices, for example, 7 supplied with a black color developer material. At the time, a corresponding portion of the recording medium 1 is wound onto the winder 3 as having been fed out from the rewinder 2. After the recording of the black color image information is completed, the driver source 14 is actuated for reverse motion to move the recording medium 1 in the direction of arrow B between the drive roller 12 and the press roller 13. In reverse to the recording movement, the same portion is then fed out from the winder 3 and rewound onto the rewinder 2. When the recording medium 1 has been rewound to a predetermined position, it is repeatedly transferred forward in the direction of arrow A for recording of the other colors of cyan, magenta, and yellow before reversed in the direction of arrow B for rewinding. Accordingly, images of different colors are overlaid one another in sequence to build up a color picture of the four colors.

Figure 4:
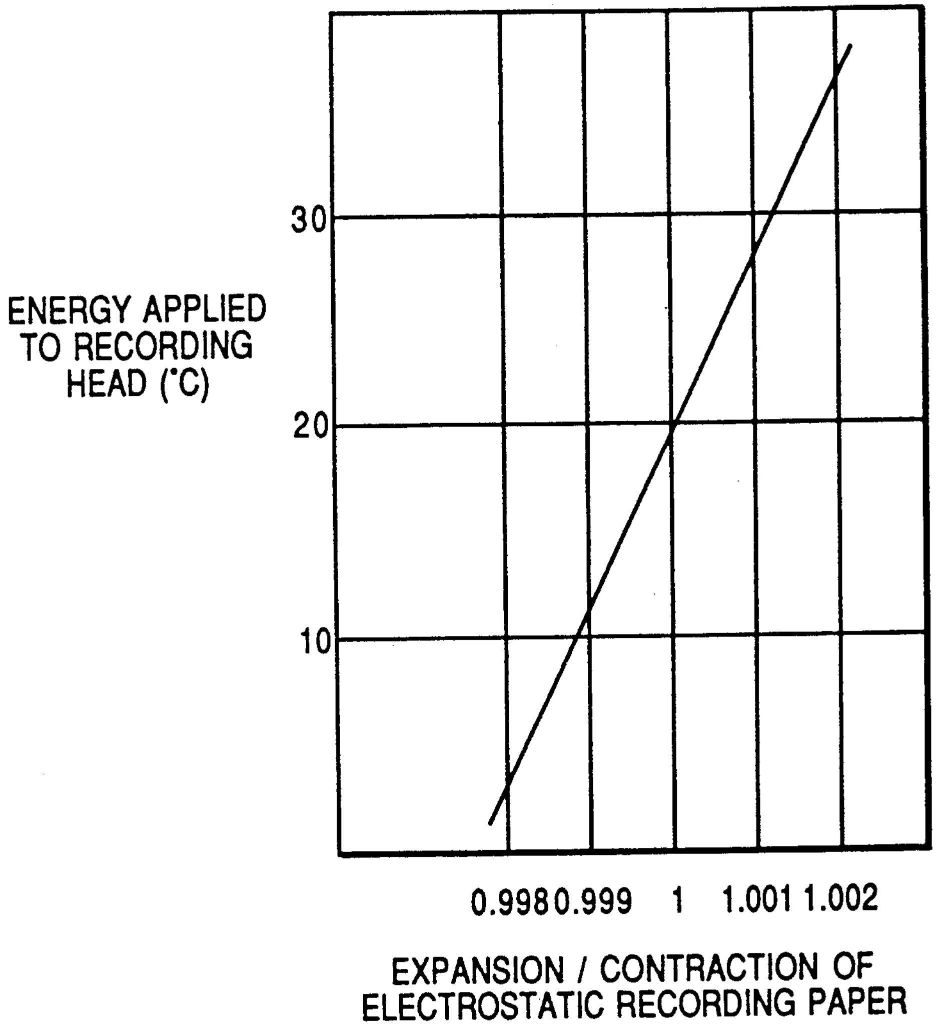
FIG. 4 is a diagram showing the relation between the energy applied to a recording head and the expansion/-contraction of a recording paper sheet.

The positioning during overlapping of the different color images will be described in detail with reference to FIG. 3 to 5.

Prior to recording by the multi-pin electrode recording head 5 onto the recording medium 1 which is transferred in the direction of arrow A as shown in FIG. 1, the positions of the register marks 15*a* and 15*b* are detected by the mark detectors 16*a* and 16*b* respectively. As shown in FIG. 3, a detection signal from the CCD sensor 20 of the mark detector 16 is input to a comparing calculator circuit 24 for comparing with a reference signal from a reference signal circuit 25 so that the expansion/contraction and the meandering of the recording medium 1 can be estimated. More particularly, as best shown in FIG. 5, the positions of the register marks 15*a* and 15*b* are assessed by timer detecting a period between the introduction of a trigger signal corresponding to a scanning start point on the CCD sensor 20 and the output of detection signals of the register marks 15*a* and 15*b* and subsequently, a difference in each of the register marks 15*a* and 15*b* can represent an amount of expansion/contraction and a deviation from the absolute position can represent a degree of meandering.

The following operation will be performed to offset the expansion/contraction of the electrostatic recording paper 1. The reference signal circuit 25 is provided with a table of the relative data of extension of the multi-pin electrode recording head to a desired amount of the head heating energy as shown in FIG. 4. The comparing calculation circuit 24 compares between signals from a mark detection circuit 23 and from the reference signals circuit 25 to determine a corresponding amount of the head heating energy to the expansion/contraction of the recording medium 1 which is in turn sent to a recording head heat-up circuit 26. The recording head heat-up circuit 26 controls coil heaters, ceramic heaters, or the like mounted on the side wall of or within the multi-pin electrode recording head 5 for heat up operation according to the signals from the comparing calculation circuit 24. The multi-pin electrode recording head 5 is substantially constituted by wire-like electrodes arranged at equal pitches and secured to one another with resin material, and thus regarded as a composite member consisting of a metal material and a resin material. When thermal energy is applied to the composite member, both the wire-like electrodes of metal material and the bonding portion of resin material expand in heat. However, as the resin material is far greater in the thermal expansion than the metal material, the thermal expansion of the wire-like electrode is minimal within the applying range of thermal energy needed for expansion of the multi-pin recording head 5 and a change in the recording dot diameter can be disregarded. Also, the thermal expansion and contraction are assured to act on each material uniformly and thus, every pitch between the electrodes can be altered at the same rate.

The following operation will be executed to offset the meandering of the recording medium 1. A compensation signal is sent from a compensation circuit 27 to a recording control circuit 28 in response to the meandering reckoned by the comparing calculation circuit 24. Thus, the timing of a recording start signal on the multi-pin electrode recording head 5 is controlled for adjustment of the recording position in the X-direction and also, the image signal shift relative to the recording start signal is executed for adjustment of the recording position in the Y-direction.

By repeating this procedure, the desired color picture is created without misconvergence of the colors between preceding and succeeding image recordings even if while being transferred, the recording medium expands or contracts due to atmospheric change or meanders due to forward and backward movement.

Figure 5:
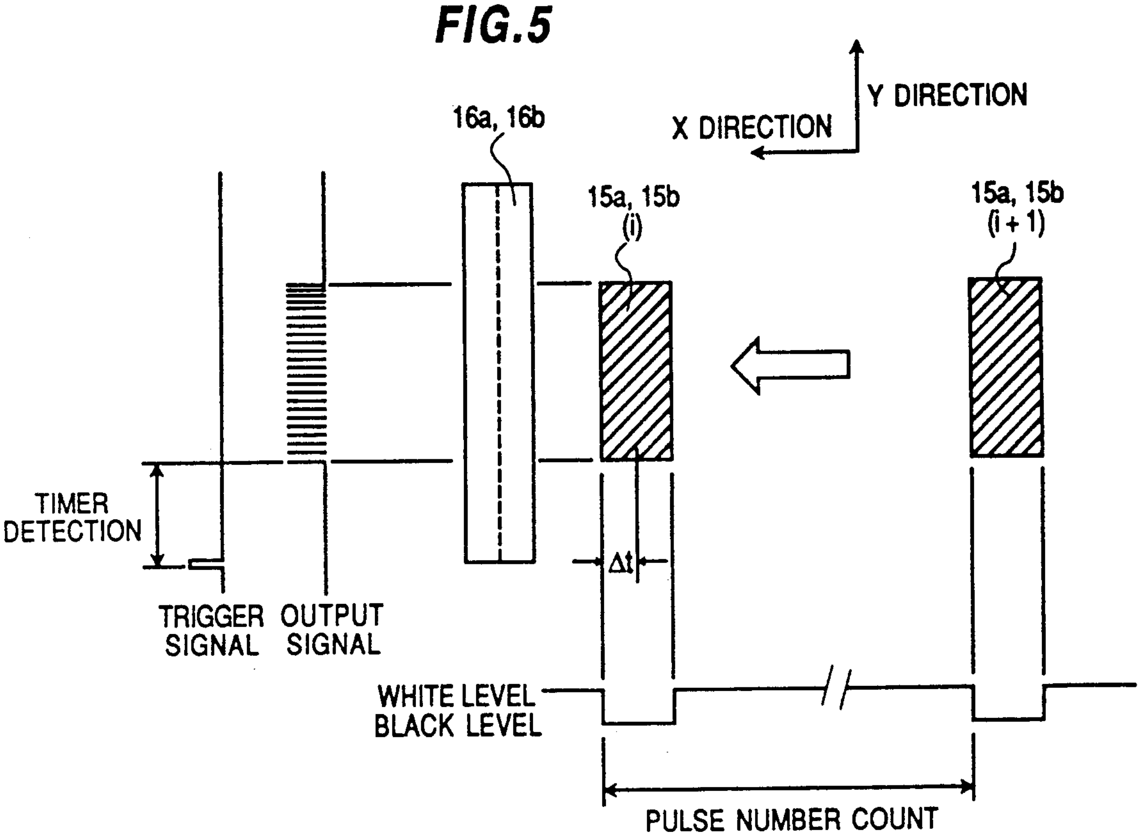
FIG. 5 is an explanatory representation showing the operation of detecting the irregularity in winding and feeding.
Figure 6:
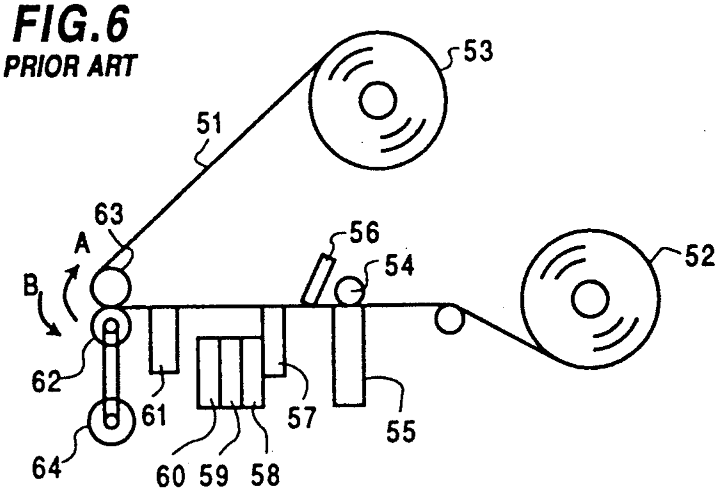
FIG.6 PRIOR ART
FIG. 6 is a schematic view of the arrangement of a prior art color electrostatic recording apparatus.

Although the detection signal from the mark detector is employed for compensation of the expansion/contraction and meandering of the recording medium according to the embodiment, it may also be used for control of irregularity in the X-directional feeding by counting the number of pulses between the register marks arranged in the transfer direction of the recording medium and altering a frequency of the timing for printing as shown in FIG. 5.

The register mark may preliminary be formed on the recording medium.

The color electrostatic recording apparatus of the present invention allows the expansion/contraction and meandering of the recording medium to be detected with the mark detector which is solely disposed on the one side of the recording medium for detection of register marks provided along both the side edges of the recording medium. Accordingly, the advantage is that the resultant detection is used for expansion/contraction of the multi-pin electrode recording head or for compensation of the position of image reproduction so that a color picture can be obtained without misconvergence of the colors while having been built up through the repeated forward and backward movements of the recording medium.

What is claimed is:

1. A color electrostatic recording apparatus comprising: transfer means for feeding a recording medium; recording means including a multi-pin electrode recording head and a plurality of developing devices provided along a transfer path of the recording medium for overlapping recording different color images in sequence onto the recording medium transferred by said transfer means; mark detecting means for provided adjacent to said multi-pin electrode recording head for detection of series of register marks arranged along at least one side edge of the recording medium; and compensation means responsive to the information given by said mark detecting means for estimating the amount of expansion/contraction and meandering of the recording medium, the former being measured at right angles to its transfer direction, and for actuating said multi-pin electrode recording head to expand or contract and shifting the recording start position of an image signal in accordance with the estimation.

* * * * *